(12) United States Patent
Morozumi

(10) Patent No.: US 7,869,917 B2
(45) Date of Patent: Jan. 11, 2011

(54) VEHICLE CONTROL APPARATUS AND CONTROL METHOD OF SAME

(75) Inventor: Hiroki Morozumi, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 352 days.

(21) Appl. No.: 12/028,033

(22) Filed: Feb. 8, 2008

(65) Prior Publication Data
US 2008/0195274 A1    Aug. 14, 2008

(30) Foreign Application Priority Data
Feb. 9, 2007    (JP) ............................ 2007-030267

(51) Int. Cl.
*G01M 17/00* (2006.01)
(52) U.S. Cl. ............................ 701/34; 700/79; 713/23; 714/23
(58) Field of Classification Search .................. 700/79; 713/2; 714/23; 701/34
See application file for complete search history.

(56) References Cited

U.S. PATENT DOCUMENTS

| 6,341,239 B1 * | 1/2002 | Hayashi et al. ............... 700/79 |
| 6,434,455 B1 * | 8/2002 | Snow et al. ................... 701/33 |

FOREIGN PATENT DOCUMENTS

| JP | 01-150920 A | 6/1989 |
| JP | 10-105468 A | 4/1998 |
| JP | 2001-282563 A | 10/2001 |
| JP | 2003-22218 A | 1/2003 |
| JP | 2003-150397 A | 5/2003 |
| JP | 2006-79168 A | 3/2006 |
| JP | 2006-253921 A | 9/2006 |
| JP | 2006-301960 A | 11/2006 |

* cited by examiner

*Primary Examiner*—Mark Hellner
(74) *Attorney, Agent, or Firm*—Sughrue Mion, PLLC

(57) ABSTRACT

A vehicle control apparatus includes a first storage area in which malfunction record information that is information on the record of a malfunction in a vehicle, and identifying information used to identify a program are stored in a nonvolatile manner; and a second storage area in which the program is stored in a rewritable and nonvolatile manner. If the identifying information stored in the first storage area does not match the identifying information corresponding to the rewritten program stored in the second storage area when rewriting of the program stored in the second storage area is completed, the control portion erases the malfunction record information in the first storage area, and rewrites the identifying information stored in the first storage area to the identifying information corresponding to the rewritten program.

10 Claims, 6 Drawing Sheets

VEHICLE CONTROL APPARATUS AND CONTROL METHOD OF SAME

INCORPORATION BY REFERENCE

The disclosure of Japanese Patent Application No. 2007-030267 filed on Feb. 9, 2007 including the specification, drawings and abstract is incorporated herein by reference in its entirety.

BACKGROUND OF THE INVENTION

1. Field of the Invention

The invention relates to a vehicle control apparatus, and a control method of the same. More specifically, the invention relates to a vehicle control apparatus that has a function of determining whether a malfunction occurs in a vehicle, and a control method of the same.

2. Description of the Related Art

Nonvolatile memories are used for various purposes. For example, the nonvolatile memory is provided in an ECU (Electronic Control Unit) for a vehicle.

Japanese Patent Application Publication No. 2006-79168 (JP-A-2006-79168) describes a technology relating to rewriting of data in a nonvolatile memory provided in an ECU for a vehicle. Similar technologies are described in Japanese Patent Application Publications No. 2006-79168 (JP-A-2006-79168), No. 2003-22218 (JP-A-2003-22218), No. 2001-282563 (JP-A-2001-282563), and No. 10-105468 (JP-A-10-105468).

Recently, in some cases, it has been required to perform OBD (On Board Diagnosis) that automatically checks the operations of sensors used for control for reducing emissions. In a vehicle used for a long period of time, by performing the OBD, it is possible to quickly determine whether repair or the like is needed. The OBD may be also performed by an ECU that controls, for example, an engine, an automatic transmission, and a hybrid system that uses the engine and a motor for driving a vehicle. In this case, by performing self-diagnosis in the vehicle, a malfunction is quickly detected.

When the OBD is performed, and it is determined that a malfunction occurs, a diagnostic trouble code (DTC) corresponding to the malfunction is written in the memory of the ECU, and a malfunction indicator lamp MIL is turned on. Then, when the vehicle is brought to a repair shop, a diagnostic tool, which is called "scan tool", is connected to the vehicle, and the diagnostic trouble code is read out from the memory of the ECU, using the scan tool. Because the diagnostic trouble code is indicated in the indication portion of the scan tool, an operator in the repair shop can determine the type of malfunction that occurs in the vehicle. After repair is completed, the diagnostic trouble code in the memory is erased using the scan tool, and the malfunction indicator lamp MIL is turned off.

Thus, when a malfunction occurs, and repair has not been performed, the malfunction indicator lamp MIL is on. Therefore, the trouble can be detected and indicated when the vehicle is examined.

However, because the diagnostic trouble code is stored in the volatile memory of the ECU, the malfunction indicator lamp may be turned off if a battery is intentionally removed to clear the memory of the ECU. Accordingly, a law, which makes it mandatory to store a specific diagnostic trouble code in the nonvolatile memory, has been enacted to reserve the record of a malfunction. The diagnostic trouble code in the nonvolatile memory cannot be erased even by the scan tool.

However, the law also states that when the program in the ECU is rewritten, the record showing the diagnostic trouble code in the nonvolatile memory may be erased, because the diagnostic trouble code in the nonvolatile memory has no meaning any more. Accordingly, when the diagnostic trouble code in the nonvolatile memory is erased, it is necessary to determine whether the program in the ECU has been rewritten.

In general, it is determined whether the program in the ECU has been rewritten, by storing, in the nonvolatile memory, identifying information unique to the program, and comparing the identifying information in the nonvolatile memory with the identifying information for the program that is currently stored in the ROM when the ECU is started. However, it is difficult to manage the identifying information for each program so that the same identifying information is not assigned to different programs.

SUMMARY OF THE INVENTION

The invention provides a vehicle control apparatus in which a diagnostic trouble code is erased based on whether reprogramming is performed, and a control method of the same.

A first aspect of the invention relates to a vehicle control apparatus that includes: a first storage area in which malfunction record information that is information on a record of a malfunction in a vehicle, and identifying information used to identify a program are stored in a nonvolatile manner; a second storage area in which the program is stored in a rewritable and nonvolatile manner; and a control portion that controls rewriting of data in the first storage area and the second storage area. If the identifying information stored in the first storage area does not match the identifying information corresponding to a second program when rewriting of the program stored in the second storage area from a first program to the second program is completed, the control portion erases the malfunction record information in the first storage area, and rewrites the identifying information stored in the first storage area to the identifying information corresponding to the second program.

The identifying information corresponding to the second program may be stored along with the second program in the second storage area. The control portion may compare the identifying information stored in the second storage area with the identifying information stored in the first storage area.

The control portion may determine whether a malfunction occurs in a sensor. If the control portion determines that a malfunction occurs in the sensor, the control portion may write, in the first storage area, the malfunction record information corresponding to the malfunction that occurs.

In the above-described aspect, the vehicle control apparatus may further include a third storage area in which the malfunction record information is stored in a volatile manner. The control portion may read out the malfunction record information stored in the third storage area, and may make an external terminal device indicate the malfunction record information stored in the third storage area, according to a command from the external terminal device. The control portion may read out the malfunction record information stored in the first storage area, and may make the external terminal device indicate the malfunction record information stored in the first storage area, according to another command from the external terminal device.

When the identifying information is not stored in the first storage area after the vehicle is started, the control portion may write, in the first storage area, the identifying information corresponding to the program that is currently stored in the second storage area.

The control portion may control at least one of an internal combustion engine, an automatic transmission, and a hybrid system that are provided in the vehicle.

A second aspect of the invention relates to a control method of a vehicle control apparatus that includes a first storage area in which malfunction record information that is information on a record of a malfunction in a vehicle, and identifying information used to identify a program are stored in a nonvolatile manner; a second storage area in which the program is stored in a rewritable and nonvolatile manner. The control method includes determining whether the identifying information stored in the first storage area matches the identifying information corresponding to a second program, when rewriting of the program stored in the second storage area from a first program to the second program is completed; and erasing the malfunction record information in the first storage area, and rewriting the identifying information stored in the first storage area to the identifying information corresponding to the second program, if it is determined that the identifying information stored in the first storage area does not match the identifying information corresponding to the second program.

The identifying information corresponding to the second program may be stored along with the second program in the second storage area. When it is determined whether the identifying information stored in the first storage area matches the identifying information corresponding to the second program, the identifying information stored in the second storage area may be compared with the identifying information stored in the first storage area.

The control method according to the second aspect may further include determining whether a malfunction occurs in a sensor; and writing, in the first storage area, the malfunction record information corresponding to a malfunction that occurs, if it is determined that the malfunction occurs in the sensor.

The control method according to the second aspect may further include writing, in the first storage area, the identifying information corresponding to the program that is currently stored in the second storage area, when the identifying information is not stored in the first storage area after the vehicle is started.

According to the first aspect and the second aspect, it is possible to determine whether reprogramming is performed, and to erase the diagnostic trouble code based on the result of the determination.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF EMBODIMENTS

Figure 1:
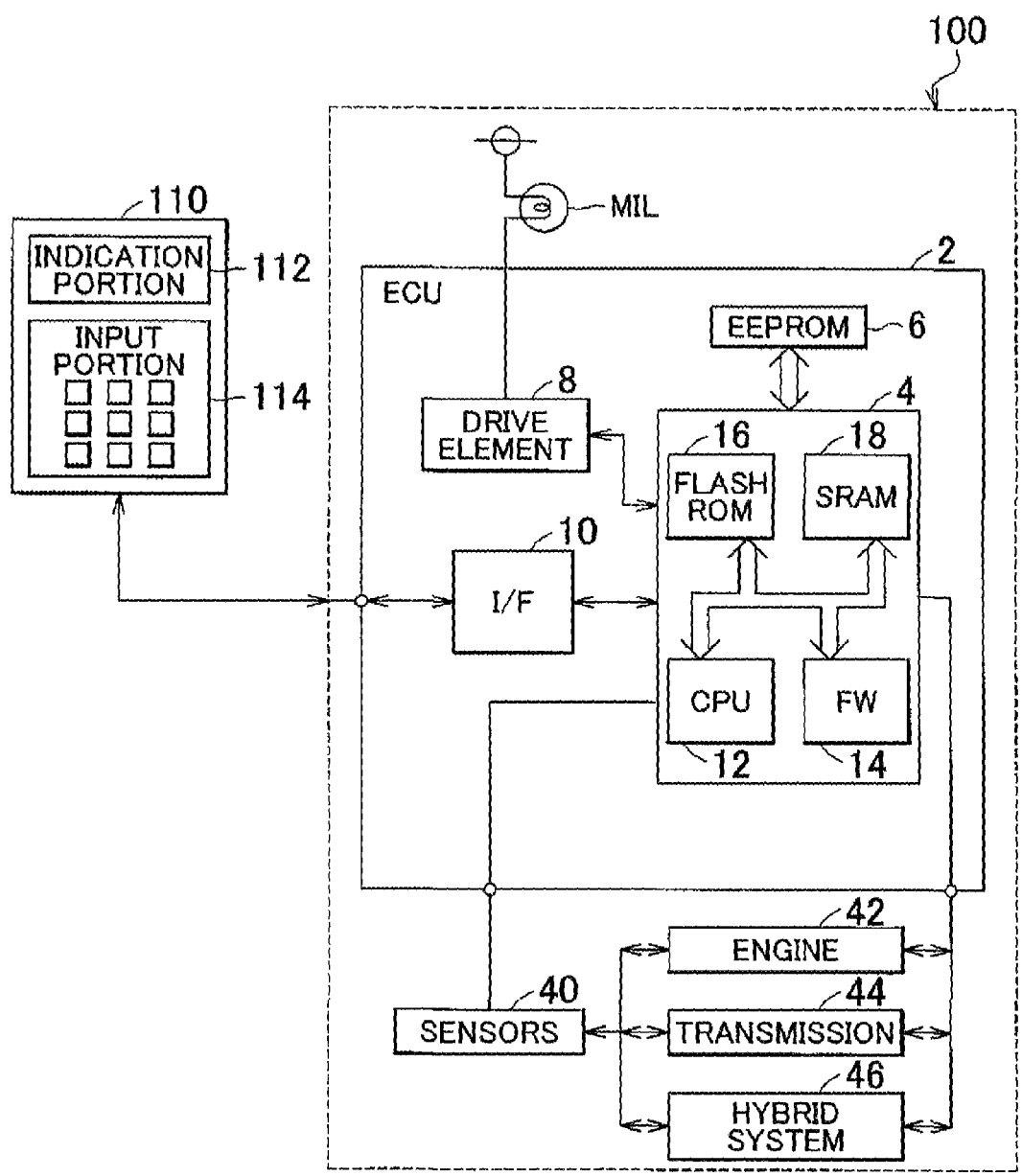
FIG. 1 is a block diagram showing the configuration of a vehicle control apparatus according to an embodiment of the invention.

Hereinafter, an embodiment of the invention will be described in detail with reference to the drawings. The same and corresponding portions in the drawings are denoted by the same reference numerals, and the description thereof will not be repeated.

FIG. 1 is a block diagram showing the configuration of a vehicle control apparatus according to the embodiment. As shown in FIG. 1, a vehicle 100 includes an engine 42; a transmission device 44; a hybrid system 46; an ECU 2 that controls the engine 42, the transmission device 44, and the hybrid system 46; and a malfunction indicator lamp MIL connected to the ECU 2. The ECU 2 may control at least one of the engine 42, the transmission device 44, and the hybrid system 46. When the vehicle 100 is a hybrid vehicle, the transmission device 44 may not be provided. The invention may be applied to a general vehicle in which the hybrid system 46 is not provided. The ECU 2 may be a control apparatus constituted by an ECU for the engine 42, an ECU for the transmission device 44, and an ECU for the hybrid system 46.

The ECU 2 includes a computer 4, an EEPROM (Electrically Erasable Programmable Read-Only Memory) 6, a drive element 8, and an interface 10. The drive element 8 drives the malfunction indicator lamp MIL. The interface 10 is connected to a scan tool 110. The computer 4 includes a CPU (Central Processing Unit) 12, a flash ROM (Read-Only Memory) 16, a SRAM (Static Random Access Memory) 18, and a firmware 14 used to rewrite data in the flash ROM 16.

The scan tool 110 is used, for example, in a repair shop, to read out a diagnostic trouble code DTC stored in the EEPROM 6 and the SRAM 18. The scan tool 110 includes an input portion 114, and an indication portion 112. A readout command and the like are input to the input portion 114. The indication portion 112 indicates the diagnostic trouble code DTC and the like.

Figure 2:
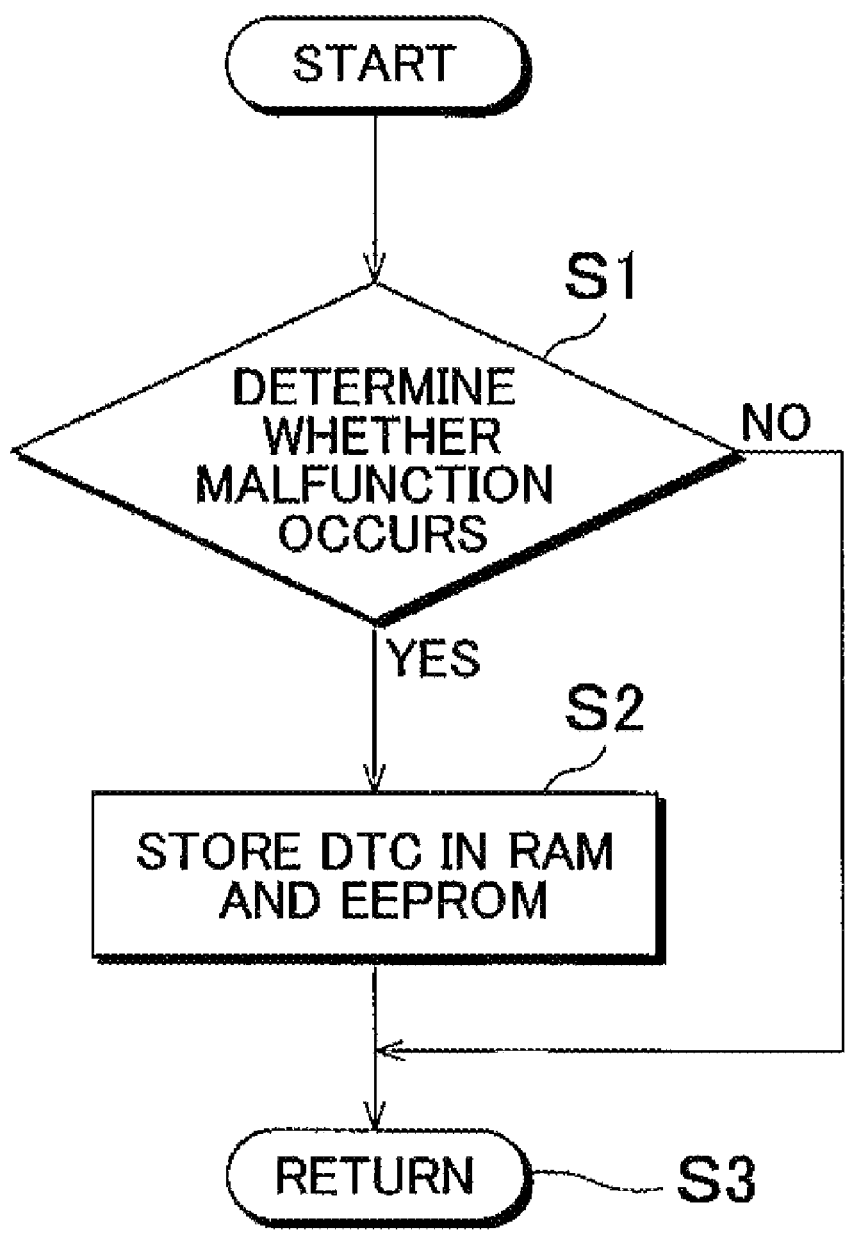
FIG. 2 is a flowchart describing operation of storing a diagnostic trouble code when OBD is performed.

FIG. 2 is a flowchart describing operation of storing the diagnostic trouble code DTC when OBD (On Board Diagnosis) is performed. The routine shown by the flowchart is invoked from a main routine, and executed each time a predetermined condition for performing the OBD is satisfied.

As shown in FIG. 1 and FIG. 2, when the condition for performing the OBD is satisfied, the routine is started. First, in step S1, it is determined whether a malfunction occurs in at least one of sensors 40. When no malfunction is detected, the routine proceeds to step S3. In step S3, control returns to the main routine.

When a malfunction is detected in at least one of the sensors 40 in step S1, the diagnostic trouble code DTC corresponding to the malfunction detected in step S2 is stored in the SRAM 18 and the EEPROM 6. Then, the routine proceeds to step S3. In step S3, the control returns to the main routine.

Thus, when a malfunction is detected, the diagnostic trouble code DTC is stored in the SRAM 18 and the EEPROM 6. When the diagnostic trouble code DTC is a specific type of DTC, the data stored in the EEPROM 6 cannot be erased by the scan tool.

Figure 3:
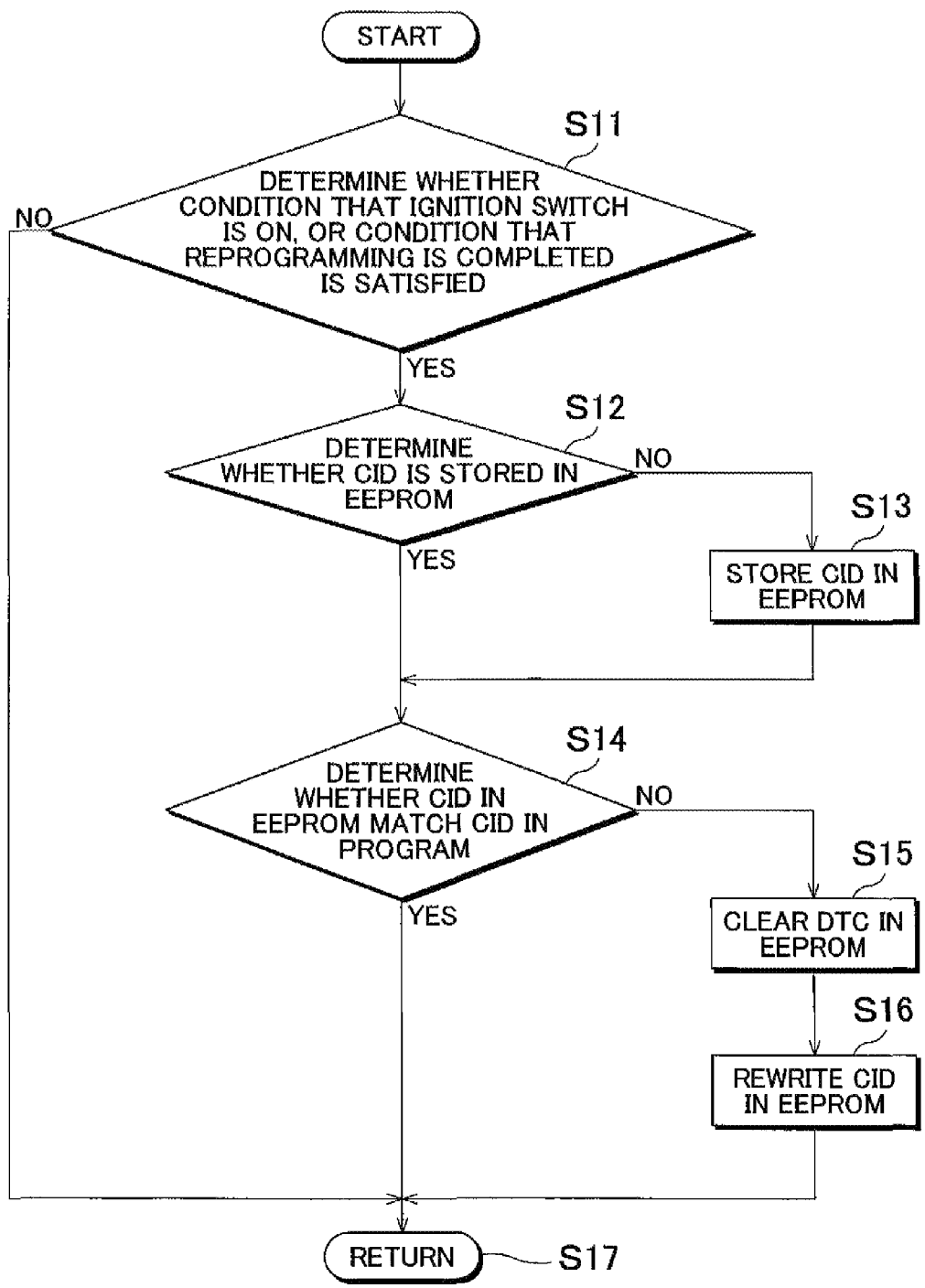
FIG. 3 is a flowchart describing a routine in which a diagnostic trouble code is erased.

FIG. 3 is a flowchart describing a routine in which the diagnostic trouble code DTC is erased. The routine shown by the flowchart is invoked from a main routine, and executed each time a predetermined time elapses, or each time a predetermined condition is satisfied.

As shown in FIG. 1 and FIG. 3, when the routine is started, first, in step S11, it is determined whether one of i) a condition that an ignition switch is operated to start the vehicle, and ii) a condition that the rewriting of a program in the ECU (hereinafter, may be referred to as "reprogramming") is completed, is satisfied. When neither of the conditions is satisfied, the routine proceeds to step S17. In step S17, the control returns to the main routine.

When one of the conditions is satisfied in step S11, the routine proceeds to step S12. In step S12, it is determined whether a CID (Calibration ID) is stored in the EEPROM 6. The CID is identifying information that is stored in the flash ROM 16 of the computer 4, and that is uniquely assigned to each program. The CID varies depending on types of programs, for example, a program for control of the engine, and a program for control of the transmission. Also, when the version of a program is changed, for example, due to improvement of the program, the CID is changed. A diagnostic communication system in conformity with SAE/ISO (Society of Automotive Engineers/International Organization for Standardization) is required to be configured so that the CID can be read out using an external device such as the scan tool.

The CID is identifying information for software, which is generally used in the OBD performed in a system relating to exhaust gas. By using the CID as identifying information for determining whether the reprogramming is performed when the diagnostic trouble code DTC is erased, the necessity of creating and managing new identifying information is eliminated.

Figure 4:
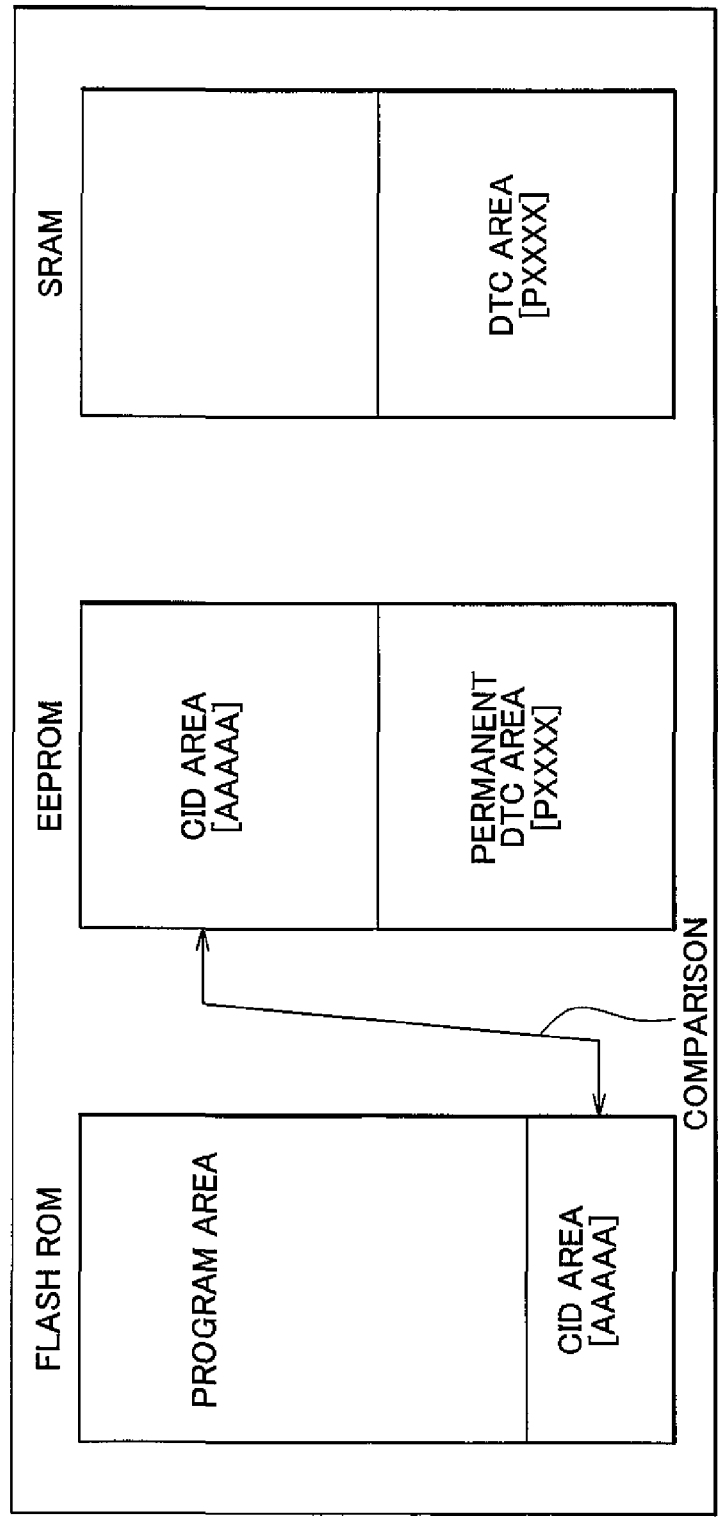
FIG. 4 is a diagram describing comparison between CIDs in step S12.

FIG. 4 is a diagram describing comparison between the CIDs in step S12. As shown in FIG. 4, a program area and a CID area are provided in the flash ROM 16 shown in FIG. 1. A program executed by the CPU 12 is stored in the program area. The CID, which is uniquely corresponding to the program, is stored in the CID area. The CID need not necessarily be stored in the CID area that is provided separately from the program area in FIG. 4. The CID may be stored in the program area as a part of the program.

FIG. 4 shows the case where the diagnostic trouble code "PXXXX" is stored in the DTC area in the EEPROM, and the DTC area in the SRAM, because the diagnostic trouble code DTC is written when it is determined that a malfunction occurs as described with reference to FIG. 2.

In step S12, the CPU reads out the CID from the EEPROM 6. When the CID is not stored in the EEPROM, for example, an initial code is read out from the EEPROM 6. Accordingly, it is determined whether the CID is stored in the EEPROM 6, based on whether the initial code is read out, or the CID is read out. When it is determined that the CID is not stored in the EEPROM 6, the CID corresponding to the program that is currently executed is written in the CID area in the EEPROM 6 in step S13. As a result, in FIG. 4, the CID "AAAAA" is written in the CID area in the EEPROM. When it is determined that the CID is stored in the EEPROM 6 in step S12, or when the CID is written in the EEPROM 6 in step S13, the routine proceeds to step S14.

In step S14, it is determined whether the CID stored in the EEPROM 6 matches the CID corresponding to the program. More specifically, the CPU 12 reads out, and compares the CID stored in the flash ROM 16 and the CID stored in the EEPROM 6. When the CID in the CID area in the flash ROM 16 is "AAAAA", and the CID in the CID area in the EEPROM 6 is "AAAAA", that is, when the CID in the CID area in the flash ROM 16 matches the CID in the CID area in the EEPROM 6, the routine proceeds from step S14 to step S17.

Thus, the diagnostic trouble code DTC is not erased, and the control returns to the main routine.

Figure 5:
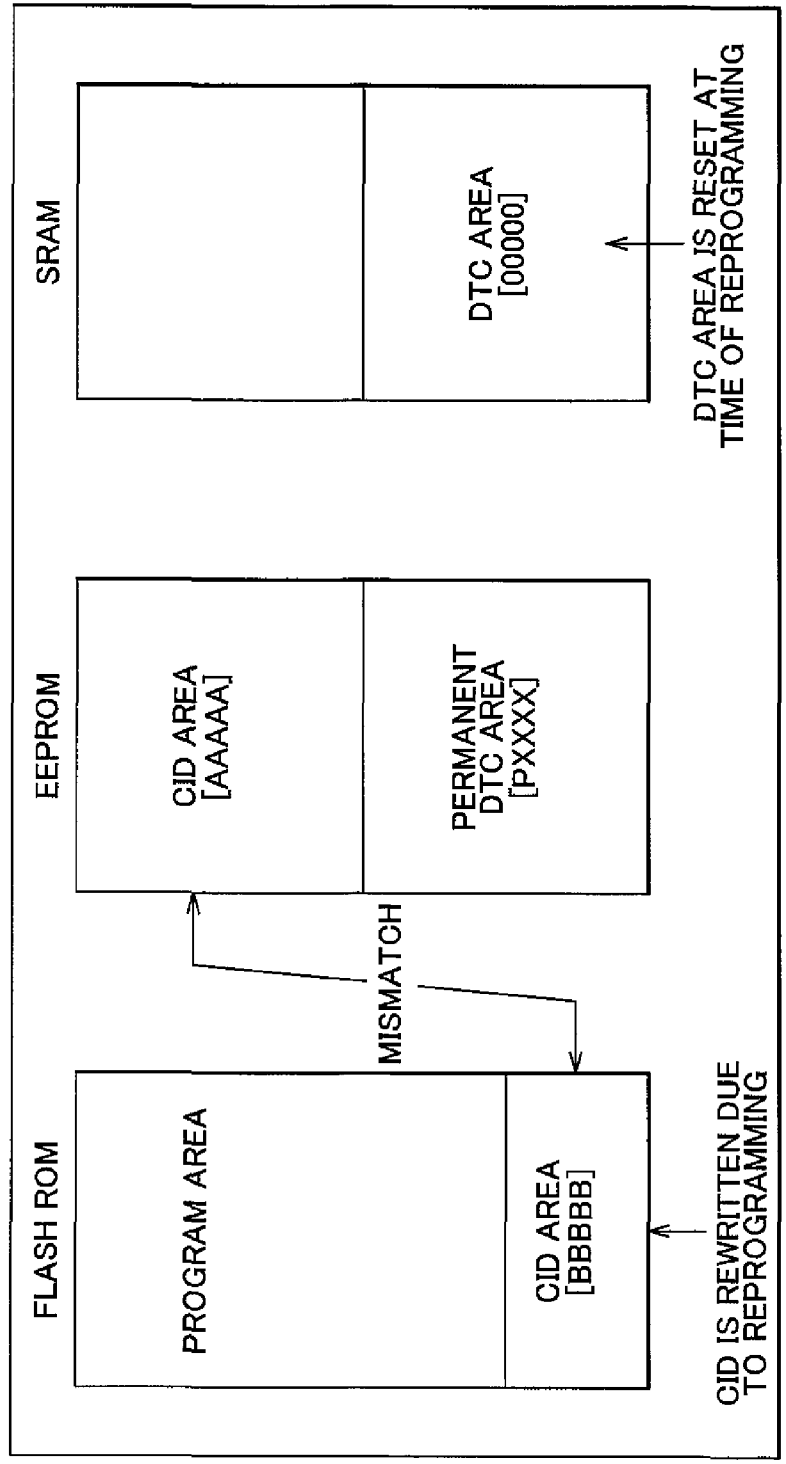
FIG. 5 is a first diagram describing the case where the diagnostic trouble code is erased.

FIG. 5 is a first diagram describing the case where the diagnostic trouble code DTC is erased. As shown in FIG. 5, the CID in the CID area in the flash ROM 16 is rewritten, and changed to "BBBBB" at the time of reprogramming. The DTC area in the SRAM is reset at the time of reprogramming, and thus, "00000" is stored in the DTC area in the SRAM. In this case, because the CID in the EEPROM 6 has not been rewritten at the time of completion of reprogramming, the CID "AAAAA" corresponding to the previous program is stored in the EEPROM 6. When the CID "BBBBB" in the CID area in the flash ROM 16 is compared with the CID "AAAAA" in the EEPROM 6, and it is determined that the CID in the CID area in the flash ROM 16 does not match the CID in the EEPROM 6 in step S14, the routine proceeds to step S15.

Figure 6:
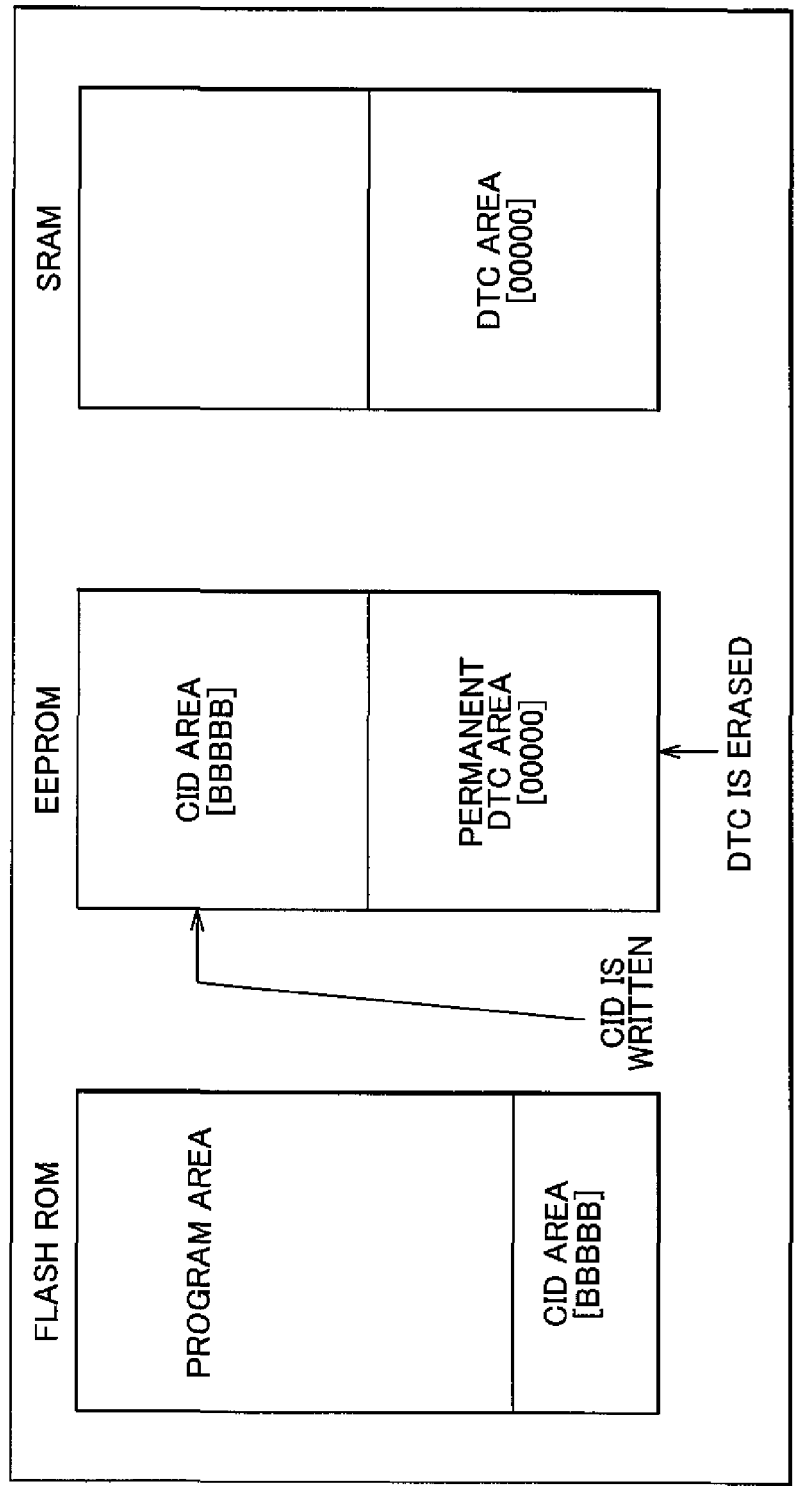
FIG. 6 is a second diagram describing the case where the diagnostic trouble code is erased.

FIG. 6 is a second diagram describing the case where the diagnostic trouble code DTC is erased. As shown in FIG. 3 and FIG. 6, in step S15, the DTC area in the EEPROM 6 is cleared, and the value in the DTC area is changed from "PXXXX" to "00000". Then, the routine proceeds from step S15 to step S16. In step S16, the CID in the EEPROM 6 is rewritten. In FIG. 6, the value in the CID area in the EEPROM 6 is changed from "AAAAA" to "BBBBB". After the process in step S16 is completed, the routine proceeds to step S17. In step S17, the control returns to the main routine.

Finally, the embodiment will be summarized with reference to FIG. 1 and the like again. The vehicle control apparatus according to the embodiment includes the EEPROM 6, the flash ROM 16, and the CPU 12. The EEPROM 6 may be regarded as the first storage area in which malfunction record information that is information on the record of a malfunction in the vehicle, and identifying information used to identify a program are stored in a nonvolatile manner. The flash ROM 16 may be regarded as a second storage area in which the program is stored in a rewritable and nonvolatile manner. The CPU 12 may be regarded as the control portion that controls rewriting of data in the first storage area and the second storage area. If the identifying information stored in the first storage area does not match the identifying information corresponding to a second program when rewriting of the program stored in the second storage area from a first program to the second program is completed, the control portion erases the malfunction record information in the first storage area, and rewrites the identifying information stored in the first storage area to the identifying information corresponding to the second program.

The identifying information corresponding to the second program may be stored along with the second program in the second storage area (flash ROM 6). The control portion (CPU 12) may compare the identifying information stored in the second storage area (flash ROM 16) with the identifying information stored in the first storage area (EEPROM 6).

The control portion may determine whether a malfunction occurs in at least one of the sensors 40 in the vehicle. If the control portion determines that a malfunction occurs in at least one of the sensors 40, the control portion may write, in the first storage area (EEPROM 6), the malfunction record information (DTC) corresponding to the malfunction that occurs, as in step S2 in FIG. 2.

The vehicle control apparatus may further include a third storage area (SRAM 18) in which the malfunction record information is stored in a volatile manner. The control portion may read out the malfunction record information stored in the third storage area (SRAM 18), and make an external terminal device indicate the malfunction record information stored in the third storage area, according to a command from the external terminal device. The control portion may read out the malfunction record information stored in the first storage area (EEPROM 6), and make the external terminal device indicate the malfunction record information stored in the first storage area (EEPROM 6), according to another command from the external terminal device.

When the identifying information is not stored in the first storage area (EEPROM 6) after the vehicle is started, the control portion may write, in the first storage area (EEPROM), the identifying information corresponding to the program that is currently stored in the second storage area (flash ROM 16).

The control portion may control at least one of an internal combustion engine (engine 42), an automatic transmission (transmission device 44), and a hybrid system 46 that are provided in the vehicle.

In the embodiment, two kinds of nonvolatile memories, i.e., the EEPROM and the flash ROM are used. However, instead of using the EEPROM and the flash ROM, different areas in one nonvolatile memory may be used.

Also, by using software in a computer, the control may be executed according to the control method described in the above embodiment. A program that makes the computer execute the control according to the control method may be stored in a storage medium (for example, a ROM, a CD-ROM, a memory card) in a readable manner, and the program may be loaded from the storage medium to the computer in the vehicle control apparatus, or the program may be provided via a communication line.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A vehicle control apparatus comprising:
    a first storage area in which malfunction record information that is information on a record of a malfunction in a vehicle, and identifying information used to identify a program are stored in a nonvolatile manner;
    a second storage area in which the program is stored in a rewritable and nonvolatile manner; and
    a control portion that controls rewriting of data in the first storage area and the second storage area,
    wherein:
    if the control portion determines that the identifying information stored in the first storage area does not match identifying information corresponding to a second program after the control portion determines that rewriting of the program stored in the second storage area from a first program to the second program is completed, the control portion erases the malfunction record information in the first storage area, and rewrites the identifying information stored in the first storage area to the identifying information corresponding to the second program.

2. The vehicle control apparatus according to claim 1, wherein:
    the identifying information corresponding to the second program is stored along with the second program in the second storage area; and
    the control portion compares the identifying information stored in the second storage area with the identifying information stored in the first storage area.

3. The vehicle control apparatus according to claim 1, wherein:
    the control portion determines whether a malfunction occurs in a vehicle-mounted sensor; and
    if the control portion determines that a malfunction occurs in the sensor, the control portion writes, in the first storage area, the malfunction record information corresponding to the malfunction that occurs.

4. The vehicle control apparatus according to claim 1, further comprising:
    a third storage area in which the malfunction record information is stored in a volatile manner,
    wherein:
    the control portion reads out the malfunction record information stored in the third storage area, and makes an external terminal device indicate the malfunction record information stored in the third storage area, according to a command from the external terminal device; and
    the control portion reads out the malfunction record information stored in the first storage area, and makes the external terminal device indicate the malfunction record information stored in the first storage area, according to a another command from the external terminal device.

5. The vehicle control apparatus according to claim 1, wherein
    when the identifying information is not stored in the first storage area after the vehicle is started, the control portion writes, in the first storage area, the identifying information corresponding to the program that is currently stored in the second storage area.

6. The vehicle control apparatus according to claim 1, wherein
    the control portion controls at least one of an internal combustion engine, an automatic transmission, and a hybrid system that are provided in the vehicle.

7. A control method of a vehicle control apparatus that includes a first storage area in which malfunction record information that is information on a record of a malfunction in a vehicle, and identifying information used to identify a program are stored in a nonvolatile manner; a second storage area in which the program is stored in a rewritable and nonvolatile manner, the control method comprising:
    determining whether the identifying information stored in the first storage area matches identifying information corresponding to a second program, after determining that rewriting of the program stored in the second storage area from a first program to the second program is completed; and
    erasing the malfunction record information in the first storage area, and rewriting the identifying information stored in the first storage area to the identifying information corresponding to the second program, if the identifying information stored in the first storage area does not match the identifying information corresponding to the second program.

8. The control method according to claim 7, wherein:
    the identifying information corresponding to the second program is stored along with the second program in the second storage area; and
    the identifying information stored in the second storage area is compared with the identifying information stored in the first storage area.

9. The control method according to claim 7, further comprising:
 determining whether a malfunction occurs in a vehicle-mounted sensor; and
 writing, in the first storage area, the malfunction record information corresponding to a malfunction that occurs, if the malfunction occurs in the sensor.

10. The control method according to claim 7, further comprising:
 writing, in the first storage area, the identifying information corresponding to the program that is currently stored in the second storage area, when the identifying information is not stored in the first storage area after the vehicle is started.

* * * * *